March 3, 1959 R. J. YOUNGQUIST 2,876,296
COUPLING CIRCUIT
Filed June 8, 1955 3 Sheets-Sheet 1
FIG. 1-A
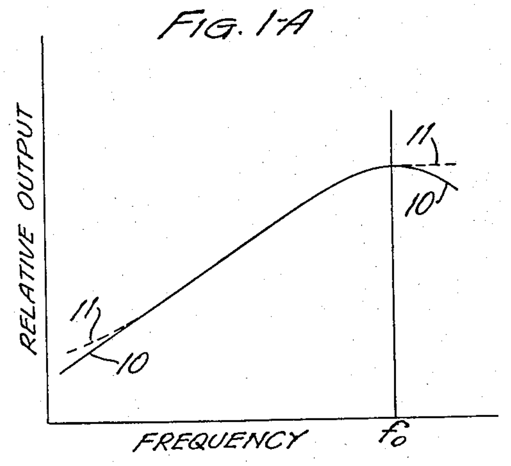
FIG. 1-B
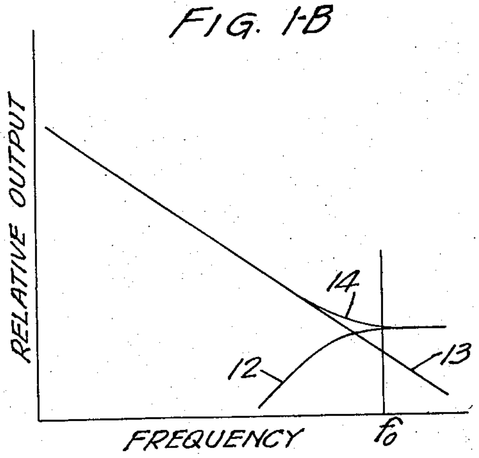
FIG. 5
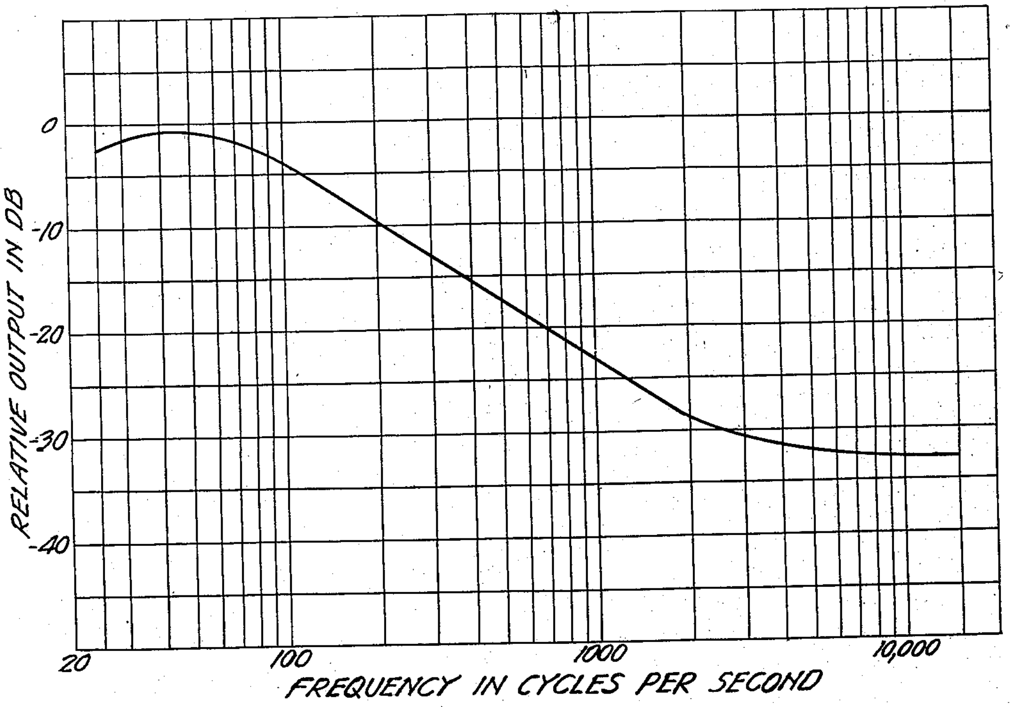
INVENTOR.
ROBERT J. YOUNGQUIST
BY
Carpenter, Abbott, Coulter, & Kinney
ATTORNEYS March 3, 1959 R. J. YOUNGQUIST 2,876,296

COUPLING CIRCUIT

Filed June 8, 1955 3 Sheets-Sheet 2

INVENTOR.

ROBERT J. YOUNGQUIST

BY

Carpenter, Abbott, Coulter & Kinney

ATTORNEYS

INVENTOR.
ROBERT J. YOUNGQUIST
BY
Carpenter, Abbott, Coulter & Kinney
ATTORNEYS 2,876,296

COUPLING CIRCUIT

Robert J. Youngquist, Roseville, Minn., assignor to Minnesota Mining & Manufacturing Company, St. Paul, Minn., a corporation of Delaware Application June 8, 1955, Serial No. 514,029

16 Claims. (Cl. 179—100.2)

This invention relates to magnetic reproducers and more particularly to coupling circuits connecting the reproducing head to the amplifier of a magnetic reproducer for correcting the frequency characteristics of the reproducer by selectively augmenting signals of relatively low frequency with respect to signals of higher frequency.

Electric signals may be recorded as magnetic variations in a ferromagnetic medium and reproduced by drawing the medium at a uniform speed past a magnetic transducing head comprising a ferromagnetic core structure and a signal coil wound thereon. The changing magnetic flux threading the core induces minute electric signals in the coil, which signals must be carefully preserved and greatly amplified in order to be useful. Because of the response characteristics of presently known magnetic recording media and recording heads, a signal appearing at the terminals of the coil, which was recorded over a range of frequencies at a uniform intensity, does not have a constant amplitude. If a sinusoidal signal of constant current is recorded over a wide range of frequencies and the voltage across the coil terminals of the reproduce head is measured in playing this signal back, the so-called constant current characteristic of the recorder is obtained. For any magnetic recorder, the voltage of the reproduced signal is very low at relatively low frequencies, rises to a peak at an intermediate frequency, and decreases again as the frequency goes higher. In order to obtain suitable reproduction of the signal, this anomaly may be corrected by the complementary adjustment of the characteristics of the magnetic recording system. That is, the signals of low and high frequency may be selectively emphasized or those of intermediate frequency may be attenuated. This may be performed either as part of the recording operation or in the reproducing operation, but usually is accomplished in both. The procedure of correcting the frequency deficiencies in magnetic recording systems is known as equalization.

The frequency at which a maximum voltage is developed across the terminals of the reproduce head, which frequency is hereinafter referred to as the frequency of peak response, varies as the speed at which the recording medium moves past the magnetic head, increasing with the speed. The frequency of peak response also depends to a lesser extent on the recording medium and the magnetic head. In audio recording at the standard speed for magnetic tape of 15 inches per second, the frequency of peak response occurs at about 5,000 cycles per second and occurs at about half that frequency at the speed of 7½ inches per second. In video recording, because of the very high tape speeds, the frequency of peak response may be 50,000 cycles or higher.

In the normal energy distribution of sound, the maximum intensity is in the range of 300 to 500 cycles per second, considerably lower than the frequency of peak response in magnetic recording at normal tape speeds. In addition, the energy distribution normally drops off to a marked degree above 1000 cycles and below about 200 cycles. In audio recording, signals above the frequency of peak response may be pre-emphasized, i. e., boosted in intensity in the recording process, without exceeding the normal intensity of signals in the 300–500 cycle range. However, the pre-emphasis of signals between 200 and 1000 cycles would result in saturation of the recording medium and produce distortion, inasmuch as the overall recording level should be maintained as high as possible to obtain effective recordings. Accordingly, signals in this intermediate range of frequencies must be equalized in the reproducing system, that is, subjected to post-emphasis. As for signals below 200 cycles, these may be pre-emphasized but not to the extent necessary to fully compensate for the constant current characteristic of a magnetic recorder without considerable distortion. These signals are conveniently subjected to both pre-emphasis and post-emphasis in accordance with considerations set out more fully below.

In the magnetic recording of video signals or of instrumentation signals, e. g. analog or digital signals, the same relationship exists between the frequency of peak response of the recording system and the distribution of energy in the recorded signals. That is, the signals having the largest amplitude are normally lower in frequency than the frequency of peak response of the recording system. It follows that in video and in instrumentation recording as well as in audio recording, high frequency signals may be fully pre-emphasized and signals at very low frequencies may be partially pre-emphasized while sufficient post-emphasis must be applied in the reproducing operation to provide an output which is essentially flat, i. e., of the same relative intensity as the recorded signals, over a desired range of frequencies.

In the usual magnetic recording system, signals above the frequency of peak response are fully pre-emphasized, and those of very low frequency are partially pre-emphasized. Post-emphasis as necessary to achieve the desired overall response is accomplished in the reproducing amplifier by increasing its sensitivity at the desired frequencies. Since any noise, that is, spontaneous current and voltage fluctuations including hum, generated in the amplifier is boosted along with the signals, the construction of the amplifier is quite critical and special low-noise tubes heated with direct current are often required in order to maintain a good signal-to-noise ratio. This, of course, makes the amplifier considerably more expensive than a conventional amplifier and more difficult to maintain. In addition, by having to supply the entire emphasis, or nearly so, required for signals in the low frequency range, the noise generated in the amplifier at those frequencies is greatly amplified and becomes a limiting factor, even when the amplifier is of special low-noise construction. While the amount of noise so generated is less disturbing in audio recording, it takes on considerable significance in video recording and in certain instrumentation applications.

In any type of magnetic recording, audio, visual or instrumentation, the falling off in intensity of signals at low frequency is due to the fact that the voltage induced in the magnetic reproducing head in the playback of signals originally recorded at even intensity decreases approximately as the frequency of the signals. Accordingly, the intensity of the electric signals in the reproducing head may be increased by boosting the voltage with a step-up transformer or by increasing the number of turns in the signal coil wound on the core of the magnetic head. However, in either case the resonant frequency of the reproducing system is lowered, beyond which frequency it is not possible to deliver sufficiently large signals to the reproducing amplifier.

In my invention, the necessary post-emphasis is entirely or almost entirely supplied prior to amplification of the reproduced signals so that noise generated in the amplifier does not constitute so great a problem. The reproduce head is coupled to the amplifier with a circuit which includes means for increasing the voltage of signals in the low frequency range, i. e., those below the frequency of peak response, with respect to the voltage of high frequency signals, the boosting of which would lower the resonant frequency of the reproducing system. This is accomplished by splitting the signals into two networks, the first of which presents a low impedance at least to signals in the high frequency range while the second includes means for selectively impeding high frequency signals while transmitting signals in the low frequency range. Additionally, in the low frequency range, the second network selectively increases the voltage of signals of relatively low frequency with respect to those of higher frequency. Accordingly, a magnetic recorder, in which signals in the high frequency range are fully pre-emphasized and signals of very low frequency are partially pre-emphasized, can utilize an essentially flat playback amplifier if the reproduce head is coupled to the amplifier by a circuit embodying the principles of this invention. That is, the signals delivered to the playback amplifier may be made essentially flat with respect to the originally recorded signals over a wide range of frequencies.

My coupling circuit when combined with a conventional amplifier in an audio magnetic recording system provides at least as great a signal-to-noise ratio as is obtainable with a conventional reproducer employing a special low-noise amplifier. It has the further advantage of employing passive elements rather than the delicate low-noise amplifier components and therefore of being more rugged and trouble-free in operation.

As for video or instrumentation recording, my invention may be combined with special low-noise amplifiers to produce extraordinarily high signal-to-noise ratios. Since inability to obtain a sufficiently large signal-to-noise ratio has been a major obstacle in the development of commercially-feasible video magnetic recorders, my invention takes on considerable importance in its application thereto. In analog recording, noise proportionately limits the achievable accuracy, and the ability of circuits embodying my invention to greatly decrease noise allows analog methods to be applied to areas in which they were not heretofore adaptable.

It is an object of this invention to provide for a magnetic reproducer a circuit for coupling the reproducing head to the amplifier, whereby extraordinarily high signal-to-noise ratios may be obtained. It is a more particular object of this invention to provide for a magnetic recording reproducer a circuit for coupling the reproducing head to a low-noise type amplifier, whereby signal-to-noise ratios entirely suitable for video magnetic recording are realized.

It is a further object of this invention to provide a coupling circuit which affords the entire post-emphasis required in audio magnetic recording over a wide range of frequencies prior to amplification of the reproduced signals. It is another object of this invention to provide for a magnetic recording reproducer a circuit composed entirely of passive elements by which is obtained the entire post-emphasis of signals necessary for video, precise instrumentation, or high-fidelity audio reproduction.

It is another object of this invention to provide suitable circuit components for use in coupling circuits as herein described. More specifically, it is an object of this invention to provide means for modifying the leakage inductance of a reproducing head core structure of a magnetic recording reproducer whereby any reproducing head core structure may be utilized in the practice of this invention.

It will be appreciated by those skilled in the art that this invention is also applicable for use in conjunction with the reproduction of mechanical records such as phonograph records by means of a magnetic pickup. It is accordingly a further object of this invention to provide a circuit for coupling a magnetic pickup for mechanical records to an amplifier, which circuit performs the entire post-emphasis required for the nearly precise reproduction of the recorded signals. It is also an object of this invention to provide means for modifying the core structure of such a magnetic pickup so that any magnetic pickup core structure may be utilized in the practice of this invention.

These and other objects of the invention will be better understood when considered in connection with the following description and the accompanying drawings in which:

Fig. 1A is a chart showing frequency response curves of a typical magnetic recording medium.

Fig. 1B is a chart illustrating the manner in which equalization is obtained in the practice of this invention.

Fig. 5 is a chart showing the frequency response characteristic curve of the circuit of Fig. 4.

Figure 2:
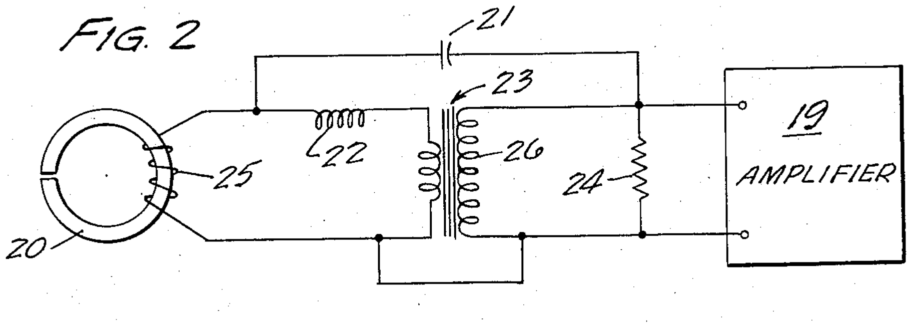
Fig. 2 is a schematic diagram of a circuit embodying the principles of the invention.

Referring to the drawings in detail, Fig. 1A shows the constant current characteristic curve 10 of a standard magnetic recording tape and magnetic head. The curve 10 is obtained by recording on the tape a sinusoidal signal of constant current amplitude at various frequencies and measuring the voltage across the terminals of the reproduce head when subsequently running the tape past the head. The curve reaches a frequency of peak response at the frequency $f_0$ which may be approximately 4000 to 5000 cycles per second for audio recording with a tape moving at 15 inches per second. At lower speeds, the peak moves to the left, and at higher speeds, to the right, so that at the tape speed of 150 inches per second, suitable for video recording, the peak may be 40,000 to 50,000 cycles per second.

As explained above, it is standard practice in the magnetic recording art to increase selectively in the recording amplifier the intensity of signals of very low frequencies and of those having a frequency above the frequency of peak response $f_0$. The pre-emphasis of the very low frequencies is relatively small and is used particularly to counteract the attenuation of signals of very low frequency inherent in magnetic heads. This results in a pre-equalized frequency response characteristic as shown by curve 11. It will be readily apparent that a considerable boost must be given in the reproducing operation to the low frequency signals, including those subjected to pre-emphasis, to complement this pre-equalized characteristic in order to obtain signals on playback approximating those originally recorded.

Reference is made to the circuit diagram of Fig. 2 in which is shown a portion of a magnetic reproducer including a high-impedance magnetic head 20, a conventional electronic amplifier 19, and a circuit coupling the two, which circuit is a specific embodiment of this invention. The coupling circuit comprises two networks, the first network including a capacitor 21. The impedance of capacitor 21 is inherently large at low frequencies and small at high frequencies, thereby effecting a close coupling at high frequencies and decoupling at low frequencies between the head 20 and the amplifier 19. The pass characteristic of the capacitor 21 is indicated generally by curve 12 of Fig. 1B.

The second network in the circuit of Fig. 2 contains an inductor 22 which inherently presents a low impedance at low frequencies and a high impedance at high frequencies. Accordingly, signals of low frequency pass through inductor 22 substantially without loss in intensity whereas high frequency signals are greatly attenuated. The second network also includes a transformer 23 which increases the voltage of signals passed by inductor 22 and applies them across load resistor 24, common to the two networks, at the input to amplifier 19. The frequency characteristic of signals transmitted through the second network is given generally by curve 13 of Fig. 1B.

Since the two networks of the circuit of Fig. 2 each modify the same signal from magnetic head 20 and apply it across load resistor 24 at the input to reproducing amplifier 19, a composite transmission characteristic for the circuit of Fig. 2 is obtained as shown by curve 14 of Fig. 1B, which curve represents the voltage across load resistor 24 for a constant amplitude voltage induced in the signal coil 25 of head 20 at all frequencies. It will be readily seen that curve 14 complements the pre-equalized characteristic curve 11 of a standard magnetic recorder so that a composite of the two would be an essentially horizontal line over a wide range of frequencies. In other words, if a constant current signal is recorded at all frequencies with pre-emphasis so that the voltage appearing across the terminals of signal coil 25 is charted by curve 11 of Fig. 1A, and if the signal is passed through the circuit of Fig. 2 whereby its voltage at any frequency is modified in accordance with curve 14 of Fig. 1B, the signal appearing across the input to amplifier 19 will have a constant intensity at all frequencies. Since no further equalization is required, the amplifier 19 may have an essentially flat characteristic. It should be noted, however, that it may sometimes be desirable to design the coupling circuit of Fig. 2 so that only a part of the required post-emphasis is accomplished thereby, reserving the balance of the post-emphasis to the amplifier. It should also be noted that while there is theoretically no roll-off in curve 14 at low frequencies, such a roll-off at very low frequencies is inherent in magnetic recorders so that the very low frequency signals are not overly emphasized as one might surmise from viewing curve 11 of Fig. 1A and curve 14 of Fig. 1B.

It will be appreciated that the attenuation of low frequency signals by capacitor 21 is incidental inasmuch as the amplitude of a low frequency signal appearing across magnetic head 20 is very small compared to the amplitude of that signal appearing across load resistor 24. However, capacitor 21 is required in the circuit to prevent the signal coil 25 of magnetic head 20 from shunting the secondary winding 26 of transformer 23. As will be shown below, a capacitor is not always required in the high frequency network, and when it is eliminated, the first network passes signals of all frequencies non-selectively. On the other hand, the second network must discriminatae against high frequency signals in that the stepping up of the voltage of such signals would lower the resonant frequency of the magnetic head 19, beyond which frequency sufficiently large signals could not be delivered to amplifier 19.

Figure 3:
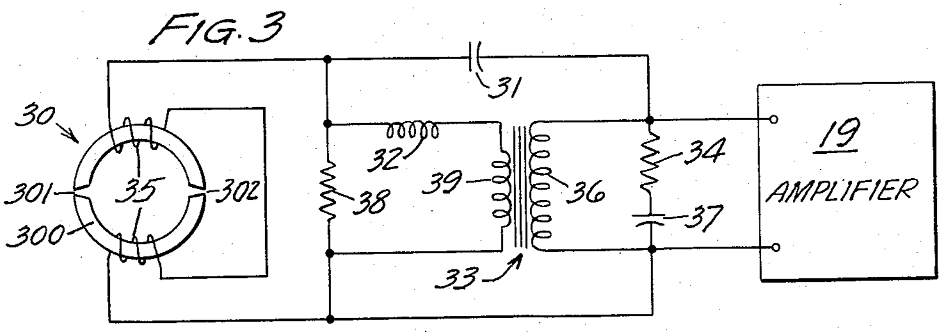
Fig. 3 is a schematic circuit diagram showing how the circuit of Fig. 2 may be modified to obtain improved performance.

In adapting my invention to standard magnetic recorders, I have found that improved results can usually be realized by adding certain elements to the circuit of Fig. 2. Referring now to Fig. 3, the components of which are numbered to correspond to like elements of Fig. 2 but including the tens digit 3 instead of 2, a capacitor 37 is inserted in series with load resistor 34 . The capacitor 37 provides a resonance with the open circuit secondary inductance of transformer 33 which partially compensates for the low frequency shunting effect of the secondary inductance. A second refinement is also desirable because the equivalent distributed capacity of the windings on transformer 33 and magnetic head 30 in conjunction with the inductance of head 30 produces a resonant condition which tends to distort the high frequency response of the circuit. Accordingly, a resistor 38 is shunted across winding 35 on magnetic head 30 to eliminate this resonance, restoring the desired frequency characteristics.

The circuit of Fig. 3 also differs from that of Fig. 2 in that it utilizes a symmetrical magnetic reproducing head 30. Its signal coil 35 is wound in two aiding sections, each on one half of the core 300 of the head 30. Since each gap 301, 302 is of identical geometry any flux induced in the core 300 by virtue of stray fields is cancelled out. Even though this type of construction must theoretically reduce to some extent the strength of signals appearing at the terminals of the signal coil 35, the practical effect is found to be insignificant. Non-symmetrical magnetic reproducing heads are also usually constructed in two sections with a divided signal coil but with the back gap corresponding to gap 302 made as insignificant as possible.

Figure 4:
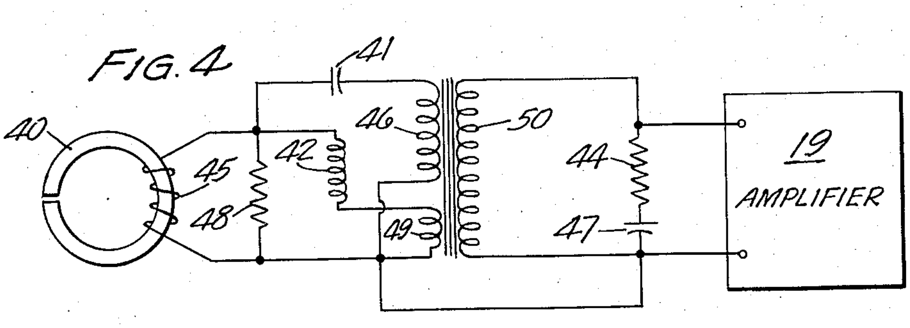
Fig. 4 is a schematic diagram of a modified circuit which is particularly useful in equalizing the output of a low impedance magnetic reproducing head.

While the circuits of Figs. 2 and 3 are adapted only for use with so-called high impedance magnetic heads, they may be readily modified if it is desired to employ low impedance heads. In any magnetic recording reproducer employing a low impedance head, an impedance matching transformer is required. This impedance matching transformer may be modified to allow selective boosting of low frequency signals in the manner of transformers 23 and 33 of Figs. 2 and 3, respectively. A suitable circuit for use in a magnetic reproducer having a low impedance head 40 is shown in Fig. 4, in which the pattern for reference characters of Figs. 2 and 3 is continued. The transformer 43 of Fig. 4 combines the functions of impedance matching and selective voltage step-up by having two primary windings 49, 46 and a single secondary winding 50. Winding 46 is in the first or high frequency network including capacitor 41 and has the ratio of turns with respect to secondary winding 50 required to match the impedance of the head 40 to that of the amplifier 19. Winding 49 in the second or low frequency network and winding 46 have the same turns ratio as windings 39 and 36, respectively, of Fig. 3 so that the low frequency signals are boosted in voltage sufficiently to provide the selective increase necessary to achieve the desired output level in addition to the proper impedance match.

It will be readily appreciated that transformer 43 could be replaced by two transformers, each having two windings, with no loss in the performance of the circuit. In other words, the required impedance matching transformer for use with low impedance heads could be placed in the high frequency network and a second transformer placed in the low frequency network, which transformer would selectively increase low frequency signals with respect to relatively higher frequency signals. In certain applications, there might be some advantage in using separate transformers to isolate the two networks from each other.

The following specific values for the circuit elements of Fig. 4 for use in an audio magnetic recording reproducer are given so that the circuit may be readily constructed by one skilled in the art and are intended as exemplary and not to any extent in a limiting sense.

| | |
|---|---|
| Inductance of head **40** | 2.5 millihenries. |
| D. C. resistance of head **40** | Less than 0.7 ohms. |
| Capacitor **41** | 0.25 microfarads. |
| Inductor **42** | 2.5 millihenries. |
| D. C. resistance of inductor **42** | Less than 0.2 ohms. |
| Transformer **43** (turns ratio of windings **49:46:50**) | 1:30:900. |
| Self inductance of winding **50** | 4000 henries. |
| D. C. resistance of winding **49** | Less than 0.25 ohms. |

| | |
|---|---|
| Total shunt capacitance of winding 50 | Less than 50 micromicrofarads. |
| Leakage inductance windings 46 to 50 referred to 50 | Less than 0.75 henries. |
| Resistor 44 | 820,000 ohms. |
| Capacitor 47 | 0.003 microfarads. |
| Resistor 48 | 56 ohms. |

A circuit constructed using these specific values was tested by inducing a constant amplitude voltage in the signal coil 45 of head 40 at a number of frequencies, noting the voltage across the input to amplifier 19, and graphing these voltages to obtain the curve of Fig. 5.

In the past several years, considerable effort has been exerted by manufacturers of magnetic recording devices and equipment to be used in conjunction therewith to establish standards of performance. It is standard practice to pre-emphasize high and very low frequency signals and to post-emphasize to obtain on playback signals having a desired relationship to those originally recorded. If, then, recordings are to be made on one magnetic recorder and reproduced on another, it is necessary that the pre-emphasis and post-emphasis characteristics of the two devices combined, effectively complement the response characteristic of the recording medium. Accordingly, a large segment of the magnetic recording industry has through the medium of the National Association of Radio and Television Broadcasters, Washington, D. C., published Supplement No. 2 to the NAB (NARTB) Engineering Handbook entitled, "NARTB Recording and Reproducing Standards," June 1953. It will be seen that the curve of Fig. 5 deviates less than 1 db from the standard reproducing characteristic appearing on page 1–3–14 of this supplement over the range of 50 to 15,000 cycles. Further, the curve of Fig. 5 deviates less than 2 db from the calculated extension of this curve to 26 cycles using the data given on page 1–3–06 of the supplement.

It is, of course, contemplated that the standard response characteristic set up by the MARTB may be altered in accordance with further developments in the magnetic recording art. It is also recognized that modified curves may sometimes be required for a variety of reasons. However, it will be apparent to one skilled in the art that changes in the component values specified in the example for the circuit of Fig. 4 could be made so as to modify the curve of Fig. 5 in accordance with the demands of the particular situation.

It should be noted that the ratio of transformation specified for transformer 43 is not at all critical. The turns ratio between primary windings 49 and 46 is ideally chosen so that signals in winding 49 are boosted in voltage relative to those in winding 46 such that the loss at low frequencies due to the differentiating action in the reproducing head and the integrating action of resistor 44 with the inductance of head winding 45 and inductor 42 is the same as the loss at high frequencies due to the dividing action of the inductances of coils 45 and 42. It has been experimentally determined that a turns ratio of 1:30 between windings 49 and 46 gives low frequency signals a sufficient boost to provide an essentially flat reproduction of recorded signals down to 50 cycles per second, which is the lower limit defined in the NARTB standard. If the turns ratio is increased beyond 1:40, the design of the circuit and the quality of the components utilized become critical, and unless great care is taken, the limit of high frequency response is lowered. Advances which may be expected in the quality of electronic circuit components may eventually make more feasible the use of a greater boost of the relative voltage of low frequency signals. As the ratio is decreased below about 1:15 or 1:10, the effect of the invention is gradually lessened. For example, in an audio system, a turns ratio of 1:15 would allow essentially flat reproduction of signals over a wide range without any equalization in the amplifier, to as low as about 100 cycles per second which is entirely adequate for many magnetic recording systems. It is therefore felt that the turns ratio between the primary windings of transformer 43 preferably falls within the range of 1:15 to 1:40. The relative number of turns in secondary winding 50 is determined by the impedance of the reproduce head 40 relative to that of the load as signified by amplifier 19. The allowable tolerance therein would then depend upon the impedance matching requirements and could be readily determined by one skilled in the art.

In constructing the circuit of Fig. 3, for use in audio recording, the impedances of elements 34 and 37 may be identical to those given above for elements 44 and 47 of Fig. 4 while the impedances of elements 31, 32 and 38 of Fig. 3 may be proportional to those of elements 41, 42 and 48, respectively, said proportion being in the impedance ratio, i. e., the square of the turns ratio, of windings 49 to 46 of transformer 43. The circuit of Fig. 3 was constructed using such comparative values, and the characteristic response curve obtained also fell within 1 db of the standard NARTB curve over the 50 to 15,000 cycle range. It should be noted here that the transformation ratio of transformer 33 of Fig. 3 is determined by the same test set out for primary windings 49, 46 of Fig. 4 and so preferably falls in the range of 1:15 to 1:40.

It will now be appreciated that an audio magnetic recording reproducer, including between its reproduce head and amplifier a coupling circuit embodying this invention, obtains a fully equalized output prior to amplification. Since post-emphasis has heretofore been performed in the reproducing amplifier, a considerable economy is thus realized in the construction of the amplifier, especially because the complicated and expensive noise-limiting construction required in the amplifier for previously known methods of coupling is now eliminated. Using this invention, the greatly increased signal level at the amplifier input overrides the noise generated in the amplifier and in fact allows the elimination of the first gain stage of a conventional amplifier without loss in performance. In addition, this invention provides added flexibility to audio magnetic recording reproducers in that a magnetic reproducing head may be coupled through a circuit embodying this invention directly to standard electronic units such as microphone amplifiers or line pre-amplifiers.

Although this invention is very useful in the field of audio magnetic recording as demonstrated above, it may eventually prove to be of far greater importance in the field of video magnetic recording. To date, no commercially suitable magnetic recorder for video signals has been developed in spite of a great demand, e. g. to solve the problems involved in delayed telecasts made desirable because of the several time zones in this country. A major limitation encountered has been the restricted signal-to-noise ratio available using presently known magnetic recording techniques. By using a circuit embodying this invention to couple a magnetic reproducing head to a presently available, low-noise amplifier, a signal-to-noise ratio is obtained far exceeding the best ratio now realizable.

When applying this invention to video recording, the circuits of Figs. 2, 3 and 4 are equally applicable. However, the shunt resistors 38 and 48 of Figs. 3 and 4, respectively, are preferably omitted to give a maximum high frequency response. Also, because of the high tape speeds customarily utilized in video recording, the circuit values must be adjusted. In a video system using a 200 inch per second magnetic recorder having a response from about 1 kilocycle to 1 megacycle, the following component values are suitable for the circuit of Fig. 4:

| | |
|---|---|
| Inductance of head 40 | 200 microhenries. |
| D. C. resistance of head 40 | Less than 1 ohm. |
| Capacitor 41 | 250 micro-microfarads. |
| Inductor 42 | 200 microhenries. |
| D. C. resistance of inductor 42 | Less than 0.3 ohm. |
| Transformer 43 (turns ratio of windings 49:46:50) | 1:25:75. |
| Resistor 44 | 15,000 ohms. |
| Capacitor 47 | .01 microfarad. |

Suitable design parameters for transformer 43 may be readily supplied by one skilled in the art in the light of the parameters previously specified for the exemplary audio magnetic recording reproducer.

For a high impedance reproducing head, the circuit of Fig. 3 may be used with the values of the corresponding components modified in accordance with the teaching above for audio recording.

The greatly improved signal-to-noise ratio achievable in magnetic recorders by virtue of this invention is also of utmost importance in instrumentation recording of various types. For example, in analog recording the precision with which data can be reproduced in proportional to the signal-to-noise ratio of the recording system. With the marked increase in the ratio obtainable in practicing this invention, analog recording techniques may be applied at considerable saving in cost over presently used methods, e. g. digital magnetic recording.

Figure 6:
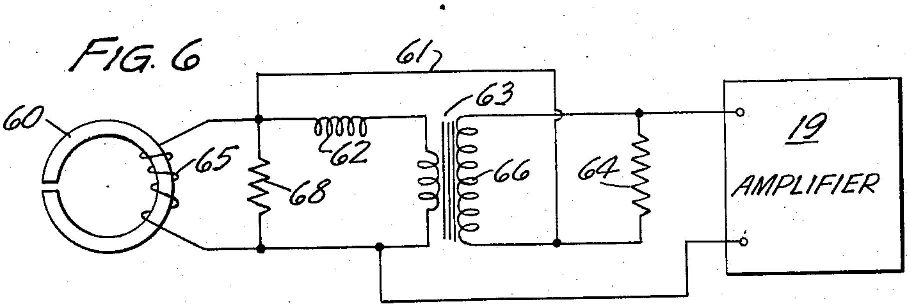
Fig. 6 is a schematic diagram of a further embodiment of the invention.

In each of the circuits of Figs. 2, 3 and 4, a magnetic reproducing head is connected to the reproducing amplifier by means of two networks connected in parallel. In the first network of each, high frequency signals are passed through a capacitor virtually without attenuation while low frequency signals are transmitted through a network designed to selectively impede signals of high frequency. As was pointed out in connection with Fig. 2, the capacitor in the first network is not included in order to discriminate against low frequency signals but only incidentally does so. It was further pointed out that where it is feasible to do so, this capacitor would be eliminated from the circuit. Reference is now made to Fig. 6 in which the two networks are connected in parallel-series relationship such that the capacitor may be eliminated. Here the low frequency network is very similar to the low frequency network of Figs. 3 and 4. Signals in the coil 65 on magnetic head 60 appearing across shunt resistor 68 are selectively impeded by coil 62 so that only low frequency signals are effectively stepped up in voltage by transformer 63 to appear across load resistor 64. The high frequency network on the other hand allows all signals to pass along line 61 and across resistor 64 which is selected to provide very little impedance thereto. In fact, this network also offers the secondary winding 66 of transformer 63 as a path alternate to that through load resistor 64 and accordingly impedes low frequency signals to a lesser extent than it does those of high frequency. Notwithstanding, the circuit of Fig. 6 is also capable of providing post-emphasis substantially equivalent to that obtained when using the circuit of Fig. 3, in audio, video or instrumentation magnetic recording.

While the circuit of Fig. 6 is useful only with a high impedance magnetic head in that it lacks impedance macthing means, it will be appreciated that it may be readily modified for use with low impedance heads in accordance with the teaching provided in connection with the circuits of Figs. 3 and 4 by one skilled in the art.

It will be seen that each of the specific circuits described above in illustrating the invention includes a transformer. However the practice of this invention does not require the use of a transformer, as will be shown in connection with the preferred simplified circuits of Figures 7 and 8.

Figure 7:
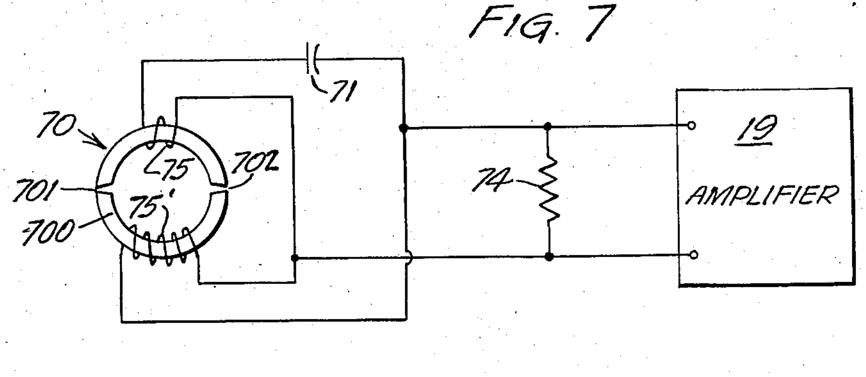
Fig. 7 is a schematic diagram of a simplified circuit embodying the principles of this inventtion.

Referring now to Fig. 7, there is shown a circuit for coupling a high impedance magnetic head 70 to a reproducing amplifier 19, which circuit like the above described coupling circuits is comprised of two networks. In this case, however, each circuit includes a separate signal coil. The first network includes signal coil 75 and capacitor 71 and so presents a high impedance to low frequency signals while effecting a close coupling between the head 70 and amplifier 19 at high frequencies. The second network includes signal coil 75′ and load resistor 74 and is accordingly an integrating network. That is, signals threading the core 700 of head 70 produce a voltage drop across resistor 74 which is the integral of the induced voltage in the playback head. The output of the second network to amplifier 19 accordingly roughly corresponds to curve 13 of Fig. 1B if the signal voltages are sufficiently stepped up with respect to the signals in the first network. This is readily accomplished by making the number of turns in signal coil 75′ large with respect to that of coil 75, for example, from about 10 to 40 times the number of turns of coil 75, the considerations in establishing this range being the same as those discussed above in conjunction with the circuit of Fig. 4.

Because magnetic head 70 is in effect a two-winding transformer, the resistance of load resistor 74 is reflected through signal coil 75′ across coil 75, and because of the high turns ratio between coils 75′ and 75, shunts signals appearing in signal coil 75 by a very low resistance. However, because magnetic heads are constructed with a gap, the leakage inductance in a head is large compared to that of a transformer, which leakage inductance is effectively in series with the shunt resistance and so increases the impedance of the shunt path substantially for signals of relatively high frequency. On the other hand, the leakage inductance between the signal coils 75, 75′ of magnetic head 70 is small when related to the first or high frequency network so that signals transmitted through this network have a frequency characteristic very similar to curve 12 of Fig. 1B. Since the two networks of the circuit of Fig. 7 each modify the same signal and apply it across load resistor 74 at the input to amplifier 19, the composite transmission characteristic of the circuit approximates curve 14 of Fig. 1B.

The leakage inductance of magnetic reproducing heads varies considerably according to design, particularly of its gap or gaps, and is generally larger in two-gap heads. While many magnetic heads now being marketed have a substantial leakage inductance and so can be utilized without modification in the circuit of Fig. 7, any magnetic head can be readily modified to bring the leakage inductance to a suitable level, and it is well established that a considerable increase in leakage inductance in a magnetic head can be tolerated without a significant decrease in the performance of the head. The circuit of Fig. 7 includes a symmetrical head 70 having a reading gap 701 and a back gap 702, and would be expected to possess sufficient leakage inductance to require no modification for use in the circuits of Figs. 7 and 8. If this were not so, it could be modified in the manner of the magnetic head 80 of Fig. 8 which includes a pair of extensions 803 projecting from the core 800 whereby a desired proportion of the flux threading the core 800 bypasses the signal coil 85′ and so increases the leakage inductance.

It should be noted here that the circuit of Fig. 7 may be modified in accordance with the teachings set forth for modifying the circuit of Fig. 2 to give the circuit of Fig. 3. That is, a shunt resistor corresponding to resistor 38 of Fig. 3 may be connected across the terminals of signal coil 75 to eliminate resonance arising out of the equivalent distributed capacity of coil 75 and the inductance of head 70; and a capacitor may be placed in series with load resistor 74 to provide a resonance with the open circuit inductance of winding 75′.

Figure 8:
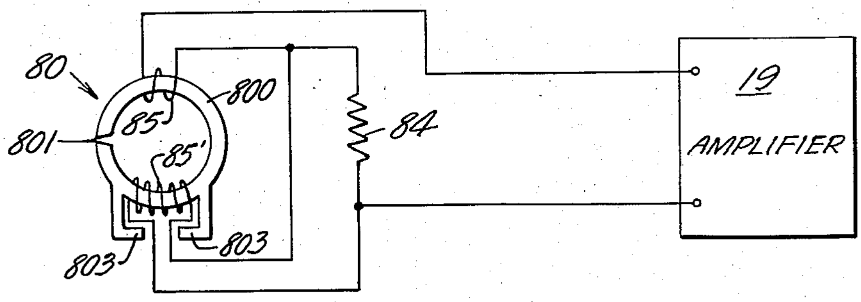
Fig. 8 is a schematic diagram of another simplified circuit which also shows means for modifying a magnetic reproducing head for use in the practice of this invention.

Reference is now made to Fig. 8 to show that the simplified form of the invention may also be modified to provide a series-parallel arrangement of the two networks.

For purposes of illustration a high impedance magnetic head 80 is chosen which has insufficient leakage inductance and so must be modified as by core extensions 803. As pointed out above, the fact that the head 80 is illustrated as having only a single reading gap 801 is incidental, the circuit being equally operable with any magnetic reproducing head as long as that head possesses a desired leakage inductance. Here, as in the circuit of Fig. 6, no capacitor is required in the high frequency network. The capacitor 71 of Fig. 7 was required to prevent signal coil 75 from shunting signal coil 75' while in this circuit no such effect is possible.

The circuits of Figs. 7 and 8 are equally applicable to video, audio, and instrumentation magnetic recording systems and may be readily constructed by one skilled in the art in light of the teachings set forth above for the construction of the circuit of Fig. 4 for audio and for video use. Because of the elimination of the need for a transformer they offer a considerable economy over the circuits of Figs. 2, 3, 4 and 6.

It will be appreciated that the circuits of Figs. 7 and 8 could be modified for use with low impedance magnetic reproducing heads, but this would entail the addition of impedance matching transformers which would offset to a large extent the economy inherent in this design.

It will be appreciated by those skilled in the art that a great many other modifications may be made in the specific circuits set forth to illustrate the invention, without departing from the concept thereof. For instance, the two frequency sensitive networks may have series connected input terminals at the magnetic head and parallel connected output terminals to the amplifier, or they may have various combinations of series and parallel relationships. In addition, the various circuits illustrated and suggested may be readily modified by one skilled in the art, in light of the teachings set forth hereinabove, for use in the magnetic reproduction of mechanical records. Therefore, it is intended that the matter contained in the foregoing description and in the accompanying drawings be considered as illustrative and not in a limiting sense.

What I claim is:

1. In a magnetic reproducer including a reproducing head and an amplifier, a coupling circuit for correcting the frequency characteristics of the said reproducer, said coupling circuit comprising: first and second networks each connecting the reproducing head to the amplifier, the first network presenting a low impedance at least to signals of high frequency and the second network presenting a low impedance at least to signals of relatively low frequency, means for isolating the high frequency signals in the first network from the second network, and means for substantially increasing the voltage of the low frequency signals with respect to the voltage of higher frequency signals.

2. In a magnetic reproducer including a reproducing head and an amplifier, a coupling circuit for selectively augmenting signals of relatively low frequency with respect to signals of higher frequency, said coupling circuit comprising: first and second networks each connecting the reproducing head to the amplifier, the first network including means for coupling high frequency and decoupling relatively low frequency signals and the second network including means for coupling at least signals of relatively low frequency, inductive means for isolating the high frequency signals in the first network from the second network, and means for substantially increasing the voltage of the low frequency signals with respect to the voltage of signals of higher frequency.

3. In a magnetic reproducer including a reproducing head and an amplifier, a coupling circuit for selectively augmenting signals of relatively low frequency with respect to signals of higher frequency, said coupling circuit comprising: first and second networks each connecting the reproducing head to the amplifier, the first network including means for coupling high frequency and decoupling relatively low frequency signals and the second network including means for coupling low frequency and decoupling relatively high frequency signals, and means for substantially increasing the voltage of said low frequency signals with respect to the voltage of signals of higher frequency.

4. In a magnetic reproducer including a low impedance reproducing head and an amplifier, a circuit coupling the reproducing head to the amplifier for selectively augmenting signals of relatively low frequency with respect to signals of higher frequency, said coupling circuit comprising: a high frequency signal path and a low frequency signal path, the high frequency signal path including first transformer means to match the impedance of the reproducing head to the amplifier by boosting the voltage of signals in said path, the low frequency signal path including means for selectively discriminating against signals of relatively high frequency while transmitting signals of low frequency and second transformer means for boosting the voltage of said low frequency signals, the ratios of transformation in the said first and second transformer means being such that the low frequency signals are boosted in voltage to a substantially greater extent than are the signals of higher frequency.

5. In a magnetic reproducer including a reproducing head and an amplifier, a coupling circuit for correcting the frequency characteristics of the said reproducer, said coupling circuit comprising: first and second networks each connecting the reproducing head to the amplifier; the first network including means for coupling at least signals of relatively high frequency and the second network including an inductor for coupling low frequency and decoupling relatively high frequency signals, transformer means for substantially boosting the voltage of said low frequency signals and a load resistor across the input of the amplifier.

6. In a magnetic reproducer including a low impedance reproducing head and an amplifier, a coupling circuit for selectively augmenting signals of relatively low frequency with respect to signals of higher frequency, said coupling circuit comprising: first and second networks each connecting the reproducing head to the amplifier; the first network including a capacitor for coupling signals of high frequency and decoupling signals of relatively low frequency and first transformer means for matching the impedance of the reproducing head to the amplifier; and the second network including an inductor for coupling low frequency and decoupling relatively high frequency signals, transformer means for substantially boosting the voltage of said low frequency signals, and a load resistor across the input of the amplifier.

7. In a magnetic reproducer including a reproducing head and an amplifier, a coupling circuit for correcting the frequency characteristics of the said reproducer and including a transformer having first and second primary windings and a secondary winding, said coupling circuit comprising: a first network connecting the reproducing head to the amplifier including a capacitor for coupling high frequency and decoupling relatively low frequency signals and the first primary and secondary windings of said transformer, the ratio of transformation in the first network being that necessary to match the impedance of the reproduce head to the amplifier by boosting the voltage of signals in said network, a second network connecting the reproducing head to the amplifier including an inductor for coupling low frequency and decoupling high frequency signals, a load resistor across the input to said amplifier, and the second primary and secondary windings of said transformer, the ratio of transformation in the second network being chosen so that the voltage step-up in the second network is substantially greater than that in the first network.

8. In a magnetic reproducer including a reproducing head and an amplifier, a coupling circuit capable of correcting the frequency characteristics of the said reproducer over a wide range of audio frequencies and including a transformer having first and second primary windings and a secondary winding, said coupling circuit comprising: a first network connecting the reproducing head to the amplifier including a capacitor for coupling high frequency and decoupling relatively low frequency signals and the first primary and secondary windings of said transformer, the ratio of transformation in the first network being that necessary to match the impedance of the reproducing head to the amplifier; and a second network connecting the reproducing head to the amplifier including an inductor for coupling low frequency and decoupling high frequency signals, a load resistor across the input to said amplifier, and the second primary and secondary windings of said transformer, the turns ratio of the second primary winding with respect to the first primary winding having a value, within the approximate range of 1:10 to 1:40.

9. In a magnetic reproducer including a high impedance reproducing head and an amplifier, a coupling circuit for selectively augmenting signals of relatively low frequency with respect to signals of higher frequency, said coupling circuit comprising: first and second networks each connecting the reproducing head to the amplifier; the first network including a capacitor for coupling signals of high frequency and decoupling signals of relatively low frequency, and the second network including an inductor for coupling low frequency and decoupling relatively high frequency signals, transformer means for substantially boosting the voltage of said low frequency signals, and a load resistor across the input of the amplifier.

10. In a magnetic reproducer including a high impedance reproducing head and an amplifier, a coupling circuit for selectively augmenting signals of relatively low frequency with respect to signals of higher frequency, said coupling circuit comprising: first and second networks each connecting the reproducing head to the amplifier; the first network including a first signal coil on the reproducing head and means for transmitting signals from said first coil to the amplifier and presenting a low impedance at least to signals of relatively high frequency, and the second network including a second signal coil on the head and means for transmitting signals from said second coil to the amplifier and presenting a low impedance at least to signals of relatively low frequency, the second signal coil having a substantially larger number of turns than said first coil.

11. The circuit of claim 10 wherein the ratio of the number of turns in the first signal coil to the number of turns in the second signal coil is in the approximate range of 1:10 to 1:40.

12. In a magnetic reproducer including a high impedance reproducing head and an amplifier, a coupling circuit for selectively augmenting signals of relatively low frequency with respect to signals of higher frequency, said coupling circuit comprising: first and second networks each connecting the reproducing head to the amplifier; the first network including a first signal coil on the reproducing head and a capacitor for selectively impeding signals of low frequency while transmitting signals of relatively high frequency, and the second network including a second signal coil on the head, which signal coil includes a substantially larger number of turns than said first coil; and means for providing a desired leakage inductance in the head whereby high frequency signals in the first network are isolated from the second network.

13. A reproducing head having a single reading gap and capable of being used in a magnetic reproducer to correct the frequency characteristics of said reproducer in conjunction with a circuit having a high frequency path including a first signal coil on the head and a low frequency path including a second signal coil on the head, said circuit coupling the head to an amplifier, said reproducing head comprising: a ferromagnetic core, a first signal coil on said core, and a second signal coil on said core having a substantially larger number of turns than said first signal coil, said reproducing head including means for increasing the leakage inductance in the head whereby high frequency signals in the first signal coil are effectively isolated from the second signal coil.

14. A high impedance reproducing head having a single reading gap and capable of cooperating with a circuit coupling the head to an amplifier in a magnetic reproducer to correct the frequency characteristics of the said reproducer without transforming the signals, said head comprising: a ferromagnetic core, a first signal coil on said core, and a second signal coil on said core having a substantially larger number of turns than said first signal coil, said reproducing head including means for providing a desired leakage inductance in the head whereby high frequency signals in the first signal coil are effectively isolated from the second signal coil.

15. A reproducing head in accordance with claim 13 wherein the ratio of the number of turns in the first signal coil is in the approximate range of 1:10 to 1:40.

16. A reproducing head in accordance with claim 13 wherein the means for providing a desired leakage inductance includes extensions of the ferromagnetic core arranged to provide a flux path bypassing the said second signal coil.

References Cited in the file of this patent

UNITED STATES PATENTS

| | | |
|---|---|---|
| 2,536,810 | Holmes | Jan. 2, 1951 |
| 2,579,125 | Perreau | Dec. 18, 1951 |

OTHER REFERENCES

The Recording and Reproduction of Sound (Read), published by Howard W. Sams and Co. (Indianapolis) 1949, page 76.